Patented Jan. 6, 1942

2,269,274

UNITED STATES PATENT OFFICE 2,269,274

METHOD OF PURIFYING 2-AMINOPYRIMIDINE

Erwin Kuh, New Brunswick, N. J., assignor to American Cyanamid Company, New York, N. Y., a corporation of Maine No Drawing. Application September 5, 1941, Serial No. 409,651

6 Claims. (Cl. 260—251)

This invention relates to an improved method of recovering 2-aminopyrimidine from aqueous solutions containing it.

2-aminopyrimidine has achieved great importance as an intermediate in the production of 2-sulfanilamidopyrimidine which is an outstanding chemotherapeutic product. 2-aminopyrimidine is technically produced by the reduction of 2-amino-4-chloropyrimidine. The reduction requires the use of zinc in an alkaline medium, preferably in the presence of some ammonium compound. As a result the 2-aminopyrimidine solution contains chlorides and carbonates of sodium, ammonium and the like, free ammonia and some complex zincates, etc. Because of the very high solubility of the 2-aminopyrimidine isolation was difficult. It has been attempted to recover the aminopyrimidine by salting out with caustic soda or extracting with organic solvents such as isopropylacetate, mixed amyl alcohols and the like. These methods have serious drawbacks. The caustic soda solution has a slow but definite destructive influence on the 2-aminopyrimidine, particularly in the presence of oxygen and the base has to be recovered from the organic solvents by extraction in an aqueous solution of its hydrochloride form and neutralization. In both cases material losses of product result and operating costs are materially increased.

According to the present invention 2-aminopyrimidine is precipitated from aqueous solutions and particularly the alkaline aqueous reaction mixture resulting from the reduction of the 2-amino-4-chloropyrimidine by treatment with sulfur dioxide, for example, by bubbling sulfur dioxide gas through the solution. The 2-aminopyrimidine reacts with the sulfur dioxide to form an acid sulfite which is relatively insoluble and which precipitates out in the form of sandy crystals that can be readily filtered and after centrifuging contain little moisture. The salt is stable and an analysis indicates that it is the acid sulfite.

The sulfite can easily be transformed into free base by several simple methods.

In general the process is not critical and good results can be obtained by passing in sulfur dioxide gas until the solution is acid to Congo. The temperature is also not critical, good results being obtained from about room temperature to 30° C. Higher temperatures are less desirable as the solubility of the sulfite then begins to increase. There is no necessity in using expensive artificial cooling because good results can be obtained at room temperature.

A further advantage of the present process is that solubility of the sulfite is so low, amounting to only 2 to 3% in the usual reaction mixture, that the mother liquor can be thrown away as the amount of 2-aminopyrimidine remaining is so small that it is not economical to attempt to recover it. This avoids all expense in treatment of the mother liquor which is a considerable factor in the high cost of the processes which have been used previously.

The invention will be described in greater detail in conjunction with the following specific examples which show various modifications of the invention, which, however, is not limited to the details therein set forth. The parts are by weight.

Example 1

A crude reaction mixture from the reduction of 2-amino-4-chloropyrimidine by means of zinc in alkaline medium was filtered to remove unreacted zinc dust and then acidified with concentrated hydrochloric acid added to bring the pH to 7.5. Zinc hydroxide is formed, precipitates and is removed by filtration in a filter press, preferably with a small amount of decoloring carbon. 25.4 parts of the clarified solution are treated with sulfur dioxide with vigorous agitation until the reaction mixture when tested on Congo red paper shows a dark brown spot. The temperature is maintained at 23–25° C. by external water cooling. Agitation is then continued for at least an hour to complete precipitation of the sulfite. 0.82 part of sulfur dioxide was needed.

The sulfite precipitates out as pure white sandy crystals which are washed white with water and sucked dry on a suction filter. The wet cake constituted 1.5 parts containing .665 part of 2-aminopyrimidine. When the clarified solution was treated by extraction with isopropyl acetate only .635 part was obtained.

Example 2

177 parts of dry 2-aminopyrimidine sulfite are added to a mixture of 100 parts of concentrated hydrochloric acid and 250 parts of water. The slurry is heated to 50° C.; further rise of temperature is governed by the evolution of sulfur dioxide. A steady stream of sulfur dioxide is developed between 55 and 85° C. and is used to precipitate 2-aminopyrimidine sulfite from a reaction mixture of the reduction of 2-amino-4-chloropyrimidine with zinc of the type described in Example 1. The temperature is gradually raised to 100° C. with vigorous agitation and a hydrochloride solution of 2-aminopyrimidine remained. The color is pale yellow. The solution is then cooled to 25° C. and a solution of 50% caustic is added with external cooling to keep the temperature from rising above 55° C. The caustic solution addition is maintained until the mixture gives a pink spot on phenolphthalein paper. On cooling to 0° C. the aminopyrimidine crystallizes out to a thick slurry of fine needles. They are filtered off, sucked as dry as possible and then dried at 45–50° C. The yield is 68% of theory of dry 2-aminopyrimidine base containing about 8% of salt. The mother liquor is then treated with sulfur dioxide and 2-aminopyrimidine sulfite precipitates therefrom. A total loss of not more than 12% results from isolation of the base.

*Example 3*

519 parts of wet filter cake of 2-aminopyrimidine sulfite containing an equivalent part of the free base are slurried in 1000 parts water and slowly heated to 80° C. while calcium hydroxide is added until a very faint red spot could be obtained on benzoazurine paper. The precipitated calcium sulfite is filtered off at 80° C. through a preheated filter press and washed with water. The volume of filtrate and first washes should be 1000 parts and the other washes amounting to 700 parts were saved separately. To the main part of the filtrate is then added 250 parts of sodium chloride and after dissolving, the solution is cooled to 5° C. The 2-aminopyrimidine is crystallized out and centrifuged as dry as possible. It is then further dried, 166 parts of the base being obtained with 6% salt content. The further washes of the calcium sulfite cake are added to the filtered mother liquor and sulfur dioxide is passed through the solution until it is acid to Congo. 100 parts of 2-aminopyrimidine were obtained, the loss being therefore about 5% and approximately ¾ of the original obtained in purified form.

*Example 4*

177 parts of dry 2-aminopyrimidine sulfite are slurried in a solution of 150 parts of aqueous ammonia and 350 parts of water. The slurry is then heated to 55° C. and ammonia added until a faint pink spot test is obtained on phenolphthalein paper. The slightly turbid solution is then treated with activated carbon and clarified if a pure white base is desired. When the base is to be used as an intermediate in the production of other products, purification is not necessary. It is then cooled to 10° C. and the 2-aminopyrimidine crystallizes out in fine white needles forming a thick but pumpable slurry. The slurry is filtered, washed carefully with 100 parts of ice cold saturated sodium chloride solution and then centrifuged as dry as possible and dried at 45–50° C.

The first crop contained 79 parts of 2-aminopyrimidine with 6% salt content. Filtrate and washings are then combined and treated with sulfur dioxide to precipitate 31 parts of 2-aminopyrimidine sulfite. Separate recovery of these liquors is unnecessary since they can be combined with the next batch of crude reduction liquor.

I claim:

1. A method of recovering 2-aminopyrimidine from aqueous solutions which comprises reacting the 2-aminopyrimidine in solution with sulfur dioxide until an insoluble sulfite is formed and recovering the 2-aminopyrimidine sulfite by filtration.

2. A method of recovering 2-aminopyrimidine from a crude reaction mixture containing the same obtained by the reduction of 2-amino-4-chloropyrimidine with zinc under alkaline conditions which comprises reacting the 2-aminopyrimidine with sulfur dioxide under conditions of acidity to Congo until the acid sulfite of the aminopyrimidine is formed and recovering the same by filtration.

3. A method of purifying 2-aminopyrimidine which comprises transforming 2-aminopyrimidine into the acid sulfite, purifying the sulfite from water-soluble impurities, decomposing the sulfite with strong mineral acid, neutralizing to produce the 2-aminopyrimidine base and recovering the same by salting out.

4. A method of purifying 2-aminopyrimidine which comprises transforming 2-aminopyrimidine into the acid sulfite, purifying the sulfite from water-soluble impurities, treating the 2-aminopyrimidine sulfite with a base capable of forming insoluble sulfite and recovering the 2-aminopyrimidine by salting out.

5. A method according to claim 4 in which the base is calcium hydroxide.

6. A method of purifying 2-aminopyrimidine which comprises transforming 2-aminopyrimidine into the acid sulfite, purifying the sulfite from water-soluble impurities, treating the 2-aminopyrimidine sulfite with sufficient ammonia to decompose the same and crystallizing out crude 2-aminopyrimidine.

ERWIN KUH.